(12) United States Patent
Punjabi et al.

(10) Patent No.: US 9,286,736 B2
(45) Date of Patent: Mar. 15, 2016

(54) METHODS AND SYSTEMS OF VEHICLE TELEMATICS ENABLED CUSTOMER EXPERIENCE

(71) Applicants: Manish Punjabi, Los Altos, CA (US); Peter Eymard Baccay, South San Francisco, CA (US)

(72) Inventors: Manish Punjabi, Los Altos, CA (US); Peter Eymard Baccay, South San Francisco, CA (US)

( * ) Notice: Subject to any disclaimer, the term of this patent is extended or adjusted under 35 U.S.C. 154(b) by 0 days.

(21) Appl. No.: 14/572,703

(22) Filed: Dec. 16, 2014

(65) Prior Publication Data

US 2015/0302667 A1   Oct. 22, 2015

Related U.S. Application Data

(60) Provisional application No. 61/916,294, filed on Dec. 16, 2013, provisional application No. 62/092,752, filed on Dec. 16, 2014.

(51) Int. Cl.
*G01M 17/00* (2006.01)
*G07C 5/00* (2006.01)
*G07C 5/08* (2006.01)

(52) U.S. Cl.
CPC .............. *G07C 5/008* (2013.01); *G07C 5/0808* (2013.01)

(58) Field of Classification Search
CPC ...... G07C 5/008; G07C 5/0808; G07C 5/085; G07C 2205/02; G06Q 10/06; B60R 16/0315; F02D 41/22
See application file for complete search history.

(56) References Cited

U.S. PATENT DOCUMENTS

| | | | |
|---|---|---|---|
| 7,103,460 B1* | 9/2006 | Breed | B60C 23/0408 701/29.1 |
| 2002/0116103 A1* | 8/2002 | Matsunaga | G07C 5/008 701/32.7 |
| 2007/0093947 A1* | 4/2007 | Gould | G07C 5/008 701/31.5 |
| 2007/0100519 A1* | 5/2007 | Engel | G07C 5/008 701/31.4 |

* cited by examiner

*Primary Examiner* — Mary Cheung

(57) ABSTRACT

An automobile including a self-diagnostic monitoring server and healing can be implemented. The vehicle monitoring system can include an automobile system comprising a self-powered motor vehicle used for transportation. The vehicle system can include a sensor system arranged on a set of components of the automobile system and coupled to an energy providing system in the automobile system to be provided with energy by said energy providing system, said sensor system obtaining data about at least one property for each component of the set of components of the automobile system and converting the data into signals. The vehicle system can include a communication system in the automobile system. The vehicle system can include an analytics system to receive the data and determine a state of each component of the automobile system based on the at least one property of each component.

15 Claims, 14 Drawing Sheets

400

800

METHODS AND SYSTEMS OF VEHICLE TELEMATICS ENABLED CUSTOMER EXPERIENCE

CROSS-REFERENCE TO RELATED APPLICATIONS

This application claims priority from U.S. Provisional Application No. 61/916,294, filed Dec. 16, 2013. This application is hereby incorporated by reference in its entirety for all purposes. This application claims priority from U.S. Provisional Application No. 62/092,752, filed Dec. 16, 2014. This application is hereby incorporated by reference in its entirety for all purposes.

BACKGROUND OF THE INVENTION

1. Field

This application relates generally to vehicle monitoring and telematics, and more particularly to a method and system of vehicle telematics enabled customer experience.

2. Related Art

Telecommunication and information processing technologies have considerably evolved and converged, resulting in a variety telematics technologies. These telematics technologies have been incorporated into vehicle and computerized fleet management systems. Examples of such applications include, inter alia: GPS navigation, vehicle tracking and automatic driving assistance.

Concurrently, vehicle monitoring and maintenance has become more complicated for vehicle owners. Vehicle owners may not have the knowledge or ability to detect when repairs are required. At the same time, sensor technologies are available to provide data about various vehicle systems.

BRIEF SUMMARY OF THE INVENTION

In one exemplary embodiment, an automobile including a vehicle monitoring system can be implemented. The vehicle monitoring system can include an automobile system comprising a self-powered motor vehicle used for transportation. The vehicle system can include a sensor system arranged on a set of components of the automobile system and coupled to an energy providing system in the automobile system to be provided with energy by said energy providing system, said sensor system obtaining data about at least one property for each component of the set of components of the automobile system and converting the data into signals. The vehicle system can include a communication system in the automobile system and wirelessly communicating with said sensor system to receive the signals from said sensor system and derive from the signals the data obtained by said sensor system. The vehicle system can include an analytics system communicating with the communication system to receive the data and determine a state of each component of the set of components of the automobile system based on the at least one property of each component, and to trigger a communication when the analytics system detects that a component is in a nonoperational state, wherein the communication is communicated by the communication system to at least one of an automobile service provider of the automobile system, a parts provider of the component or a Vehicle Operation Center associated with the vehicle system.

BRIEF DESCRIPTION OF THE DRAWINGS

The present application can be best understood by reference to the following description taken in conjunction with the accompanying figures, in which like parts may be referred to by like numerals.

Figure 1:
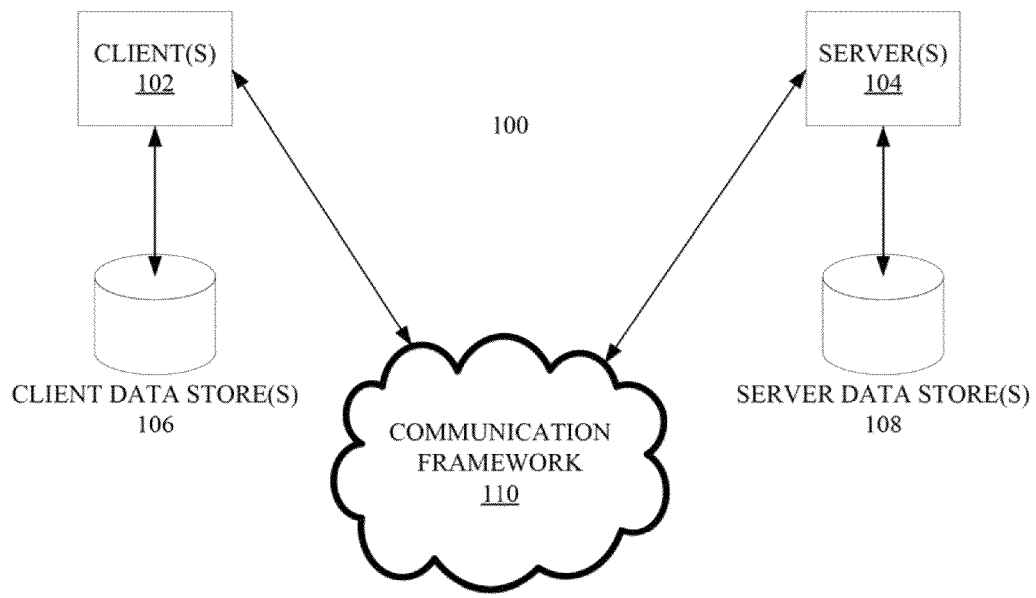
FIG. 1 is a block diagram of a sample computing environment that can be utilized to implement some embodiments.

The Figures described above are a representative set, and are not an exhaustive with respect to embodying the invention.

DETAILED DESCRIPTION

Disclosed are a system, method, and article of manufacture of intelligent vehicle applications. The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, nunmerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Exemplary Architecture and Systems

FIG. 1 is a block diagram of a sample computing environment 100 that can be utilized to implement some embodiments. The system 100 further illustrates a system that includes one or more client(s) 102. The client(s) 102 can be hardware and/or software (e.g., threads, processes, computing devices). The system 100 also includes one or more server(s) 104. The server(s) 104 can also be hardware and/or software (e.g., threads, processes, computing devices). One possible communication between a client 102 and a server 104 may be in the form of a data packet adapted to be transmitted between two or more computer processes. The system 100 includes a communication framework 110 that can be employed to facilitate communications between the client(s) 102 and the server(s) 104. The client(s) 102 are connected to one or more client data store(s) 106 that can be employed to store information local to the client(s) 102. Similarly, the server(s) 104 are connected to one or more server data store(s) 108 that can be employed to store information local to the server(s) 104.

Figure 2:
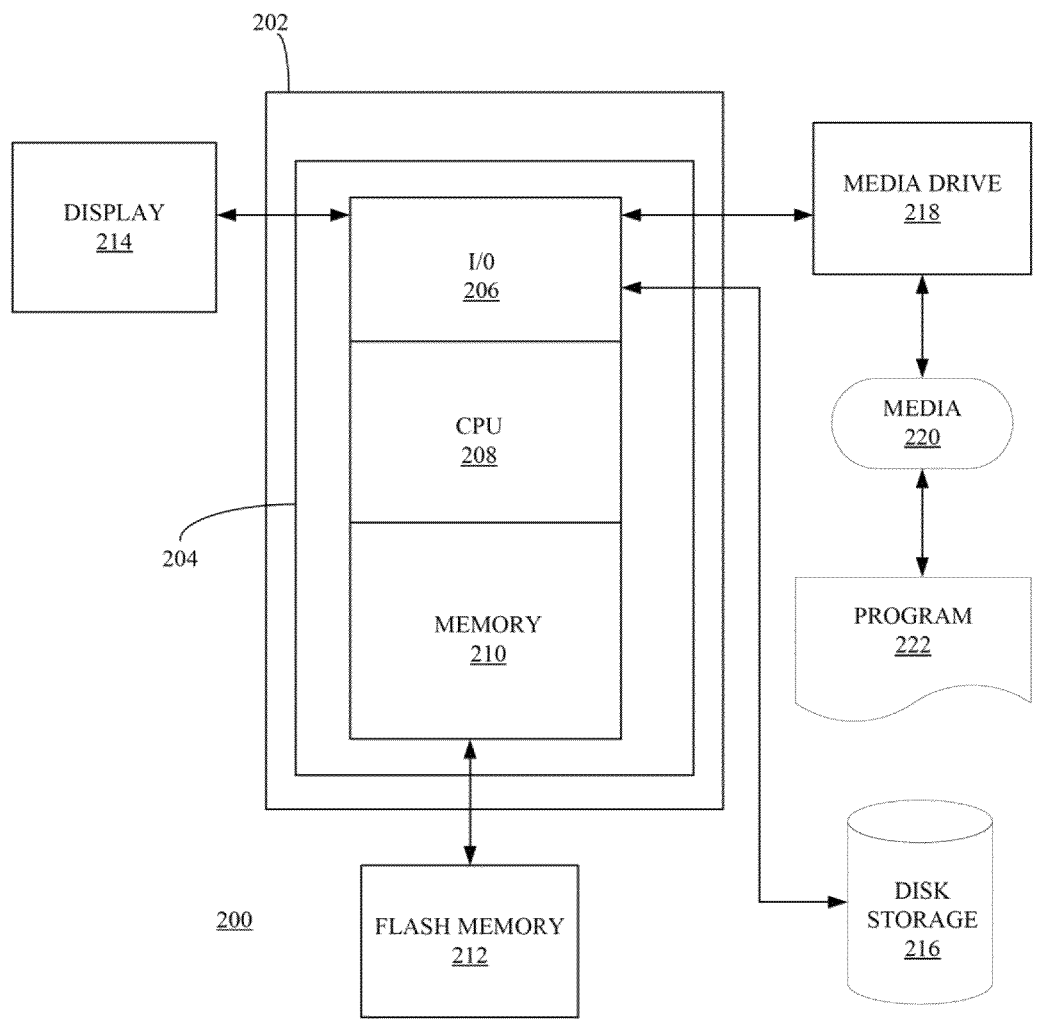
FIG. 2 depicts an exemplary computing system that can be configured to perform any one of the processes provided herein.

FIG. 2 depicts an exemplary computing system 200 that can be configured to perform any one of the processes provided herein. In this context, computing system 200 may include, for example, a processor, memory, storage, and I/O devices (e.g., monitor, keyboard, disk drive, Internet connection, etc.). However, computing system 200 may include circuitry or other specialized hardware for carrying out some or all aspects of the processes. In some operational settings, computing system 200 may be configured as a system that includes one or more units, each of which is configured to carry out some aspects of the processes either in software, hardware, or some combination thereof.

FIG. 2 depicts computing system 200 with a number of components that may be used to perform any of the processes described herein. The main system 202 includes a motherboard 204 having an I/O section 206, one or more central processing units (CPU) 208, and a memory section 210, which may have a flash memory card 212 related to it. The I/O section 206 can be connected to a display 214, a keyboard and/or other user input (not shown), a disk storage unit 216, and a media drive unit 218. The media drive unit 218 can read/write a computer-readable medium 220, which can contain programs 222 and/or data. Computing system 200 can include a web browser. Moreover, it is noted that computing system 200 can be configured to include additional systems in order to fulfill various functionalities. In another example, computing system 200 can be configured as a mobile device and include such systems as may be typically included in a mobile device such as GPS systems, gyroscope, accelerometers, cameras, augmented-reality systems, image recognition application, etc. In some embodiments, computing system 200 can be a smart phone, a tablet computer, a wearable computer such a smart watch or an optical head-mounted display (OHMD) (e.g. Google Glass®), and the like. Computing system 200 can also be installed into a vehicle computing system and provide information about the vehicle's state (e.g. on-board diagnostics (OBD) codes and the like) to an onboard telematics unit (e.g. a telematics device such as a 'vehicle dongle') and/or communicatively coupled mobile device application. Computing system 200 can communicate with other computing devices based on various computer communication protocols such a Wi-Fi, Bluetooth® (and/or other standards for exchanging data over short distances includes those using short-wavelength radio transmissions), USB, Ethernet, cellular, etc. Computing system 200 and/or the onboard telematics unit can access an onboard telematics unit a vehicle bus using a vehicle bus standard such as the controller area network (CAN) bus protocol. As used herein, OBD can refer to a vehicle's self-diagnostic and reporting capability. OBD can be augmented and/or replaced by API's provided by vehicle manufacturers. OBD systems can provide access to the status of the various vehicle sub-systems. OBD can include any of the various OBD protocols and/or systems (e.g. OBD-I, OBD-II, JOBD, ADR 79/01 & 79/02 and/or EOBD).

Figure 3:
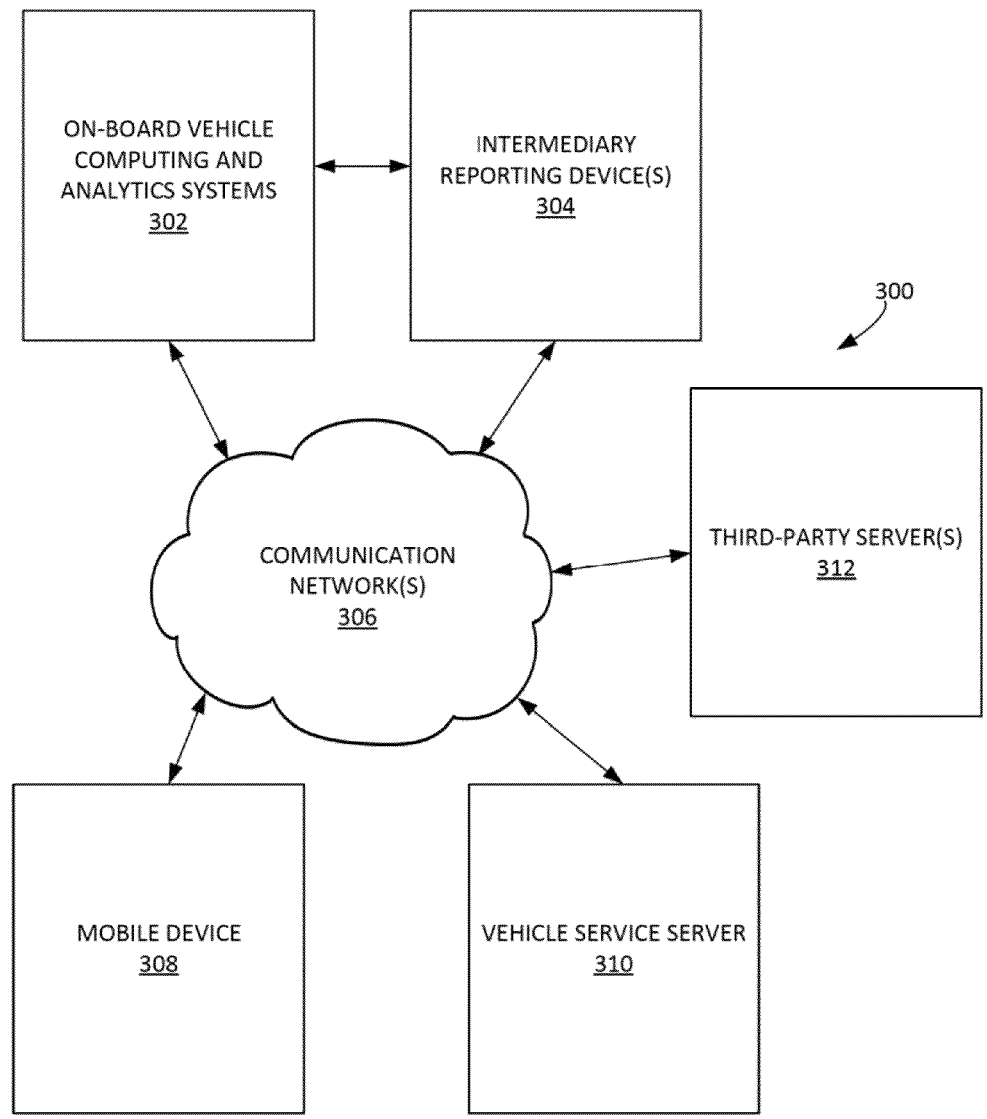
FIG. 3 depicts another exemplary system for implementing various intelligent vehicle applications, according to some embodiments.

FIG. 3 depicts another exemplary system for implementing various intelligent vehicle applications, according to some embodiments. On-board vehicle computing systems 302 can include various computing system integrated into a vehicle (e.g. various OBD systems, vehicle sensor drivers, vehicle systems managers, environmental control systems, diagnostics, etc.). On-board vehicle computing systems 302 can provide a standardized hardware interface for intermediary reporting devices 304. On-board vehicle computing systems 302 can also include networking functionalities and systems to communicate with other entities of FIG. 3 via communication network(s) 306.

Intermediary reporting device(s) 304 can include various tools are available that plug into the OBD connector to access OBD functions. Intermediary reporting device 304 can include a dongle and/or other piece of hardware that connects to on-board vehicle computing systems 302. For example, intermediary reporting devices 304 can include data loggers. As used herein, a data logger capture vehicle data while the vehicle is in operation, for later analysis. A data logger can obtain engine and vehicle operations for diagnosis or tuning. Intermediary reporting devices 304 can monitor and record driver behavior. Intermediary reporting devices 304 can interface with on-board vehicle computing systems 302 (e.g. via Bluetooth, USB port, OBD-II diagnostic connector, etc.). Intermediary reporting devices 304 can obtain various vehicle state information (e.g. OBD data, vehicle sensor data) can provide it to mobile device 308 and/or vehicle service server 310. Intermediary reporting devices 304 can perform various vehicle telematics functions. It is noted that Intermediary reporting devices 304 can be agonistic as to the various makes, models and/or production years of vehicles.

Mobile device 308 can include one or more applications for analyzing and/or presenting vehicle information to a user (e.g. see FIGS. 4-11). Vehicle information can include vehicle state data, vehicle manuals, vehicle marketing information, vehicle repair data and the like. The data can be real-time and/or statics data. Vehicle information can also include social networking information, location data, vehicle environmental data, and vehicle 'health' data (e.g. as defined by the various sub-systems of the vehicle), etc. Vehicle environment can be adjusted based on a setting/mode selected by user. In some examples, mobile device 308 data can be utilized as a proxy for a vehicle state when it is determined that the mobile device is in said vehicle. For example, the mobile device's sensors can be used to determine the values of such variables as speed, orientation, travel route, location of the vehicle when it has been determined that the mobile device is collocated with the vehicle. These applications can be client applications of vehicle service server 310. In some examples, vehicle service server 310 can be implemented locally in the vehicle itself and/or in a cloud-computing platform, in whole or in part. Vehicle service server 310 can track the vehicles service history. Mobile device 308 can serves as an Internet and/or cloud gateway for sending vehicle data (e.g. user driving behavior, vehicle/user statistics, vehicle diagnostic trouble codes and/or any data produced by an OBD2 interface) to another entity of system 300 via computer network(s) 306. In one example, the OBD2 port can utilized as a media interface. Accordingly, an OBD2 dongle can be utilized as digital media player (e.g. a Chromecast® device) for the vehicle. In this way, the OBD2 dongle can broadcast audio/video files from a user's mobile device to the vehicle. Mobile device 308 can include one or more applications that allow a user to access the functionalities of vehicle service server 310.

Vehicle service server 310 can include one or more applications for gathering and analyzing vehicle information. Vehicle service server 310 can obtain vehicle information from any entity provided in FIG. 3. Vehicle service server 310 can maintain singular unified service history of each vehicle registered with it. This service history can be stored locally in any entity of system 300 as well as in a cloud-computing environment. Unified service histories for vehicle registered with system 300 can be maintained in a database managed by the vehicle service server 310. Vehicle service server 310 can query third-party servers 312 to obtain information related to a vehicle include, inter alia: vehicle manuals, repair history, repair costs, vehicle part costs and/or recall information. Additionally, vehicle service server 310 can perform any of the other processes provided infra. Vehicle service server 310 can include search engine and web crawler functionalities. Vehicle service server 310 can include functionalities for order user preferences based on user provided preferences (e.g. relating to automatically scheduling service and/or other repair options). Vehicle service server 310 can include functionalities for locating/tracking vehicles (e.g. utilizing various GPS and/or Assisted GPS systems). This information can be provided to a client application in mobile device 308. Additionally, the tracking functionality can enable a user to control permissions to various vehicle systems remotely. Vehicle service server 310 can include functionalities for: notifying vehicle owner of any vehicle service needs and/or repair needs; associating promotions (e.g. coupons and/or other offers) through relevancy with a vehicle's respective service and/or repair needs; prognostics (e.g. predictive vehicle diagnostics) on vehicle issues before they occur; and/or notifying a user of any relevant recalls, bulletins, complaints, service reminders, and/or other problems when issues are detected. Vehicle service server 310 can implement a vehicle relationship management (VRM) service. The VRM service can enable a customer relationship system with relevance based on such factors as year/make/model/submodel of the vehicle. The VRM service enables the vehicle to communicate with the automobile manufacturer, dealer and/or local service provide. This communication can be the enabler of the customer relationship.

Third-party servers 312 can include a server for any third party enterprise involved in an intelligent vehicle application service (e.g. customer relationship management entities, vehicle retailers, fleet managers, repair shops, vehicle parts retailers, vehicle parts manufacturers, insurance providers, vehicle health, etc.). Third-party servers 312 can provide various application programming interfaces (APIs). In some examples, API's can be provided based on such factors as year, make and/or model. Alternatively, API's can be agnostic to such factors. API's can be available for queries by applications in mobile device 308 and/or vehicle service server 310. It is noted that the certain entities of FIG. 3 such as vehicle service server 310 and/or third-party servers 312 can be implemented in a cloud computing environment. Mobile device 308 (e.g. a smart phone, a wearable computer, a head-mounted display, etc.) can communicate directly with the vehicle's computing system (e.g. via a local area network, etc.). Vehicle service server 310 can store the vehicle specifications and update said specifications when new components are added. Any entity of FIG. 3 can be implemented in a cloud-computing environment.

Example User Views

Figure 4:
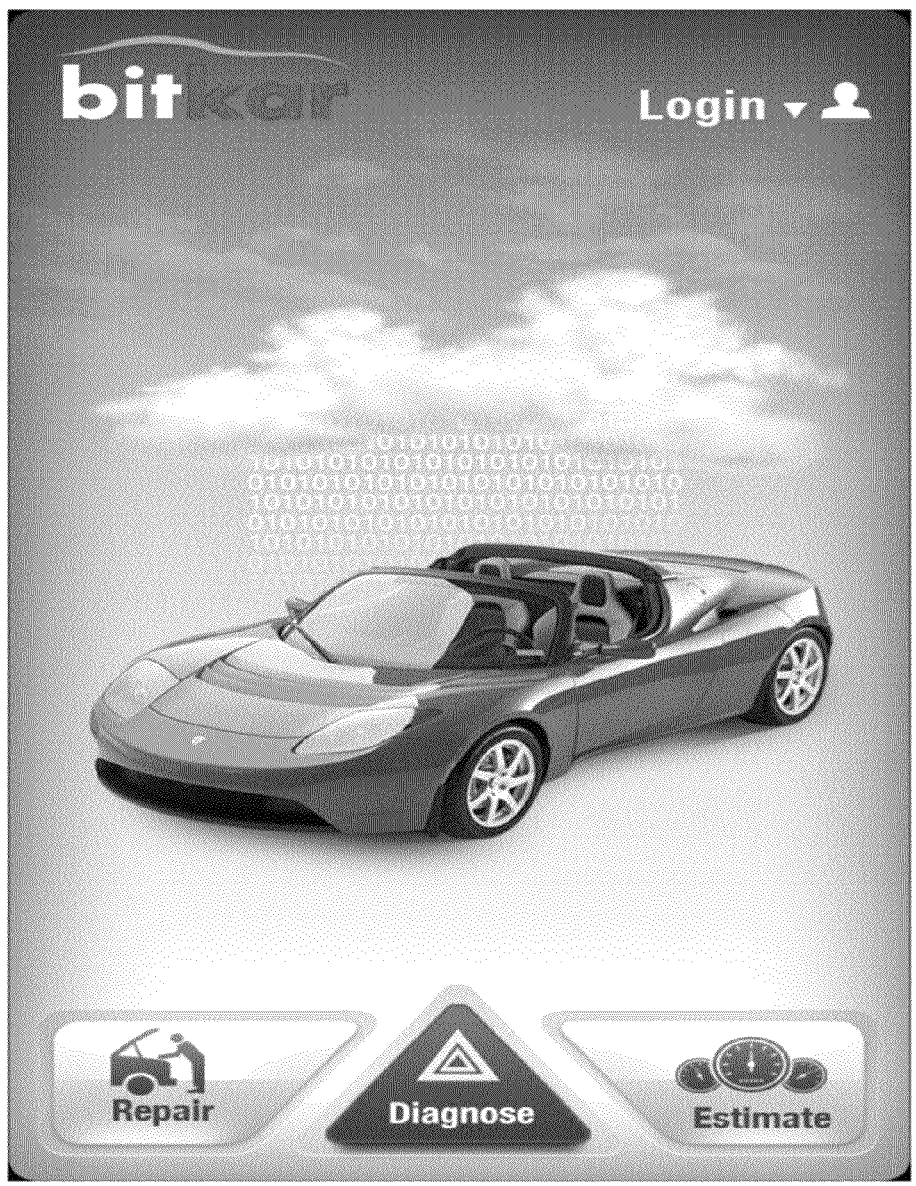
FIGS. 4-11 provide example screen shots of an intelligent vehicle application operating in a mobile device, according to some embodiments.
Figure 5:
Figure 6:
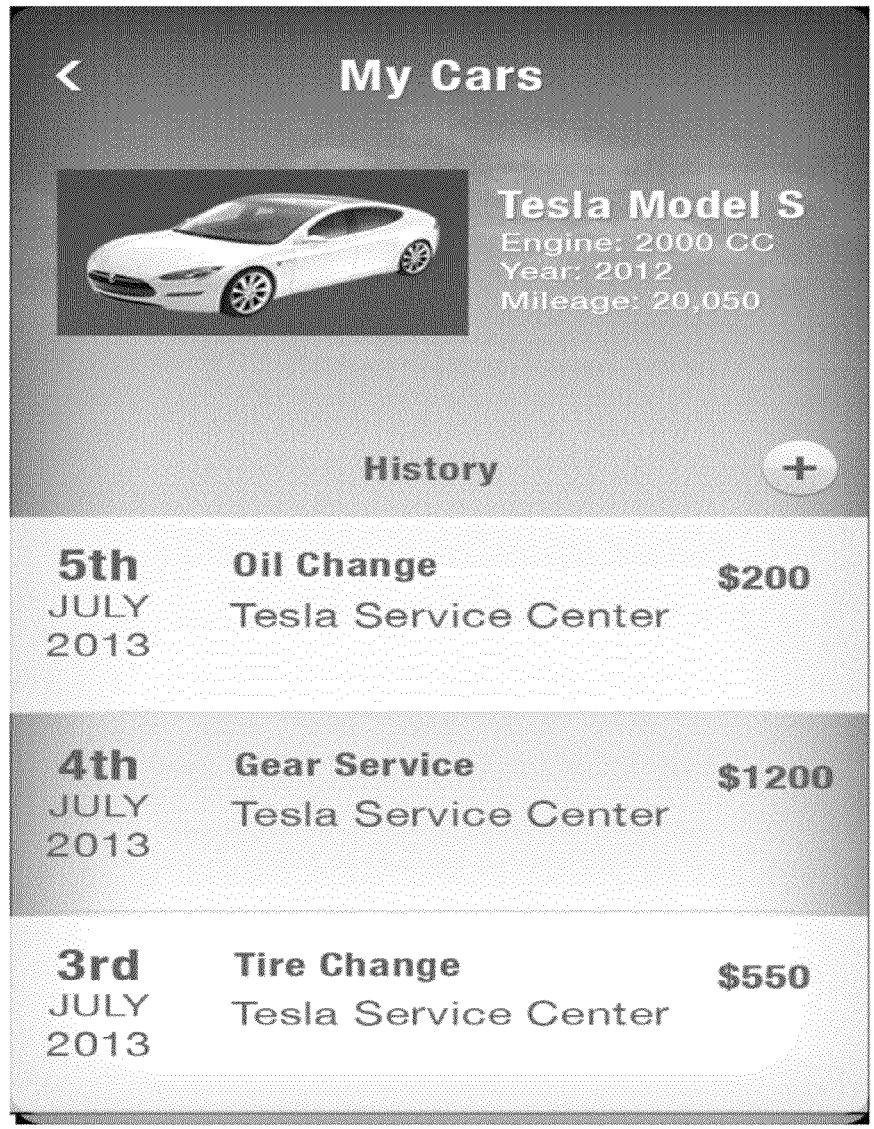
Figure 7:
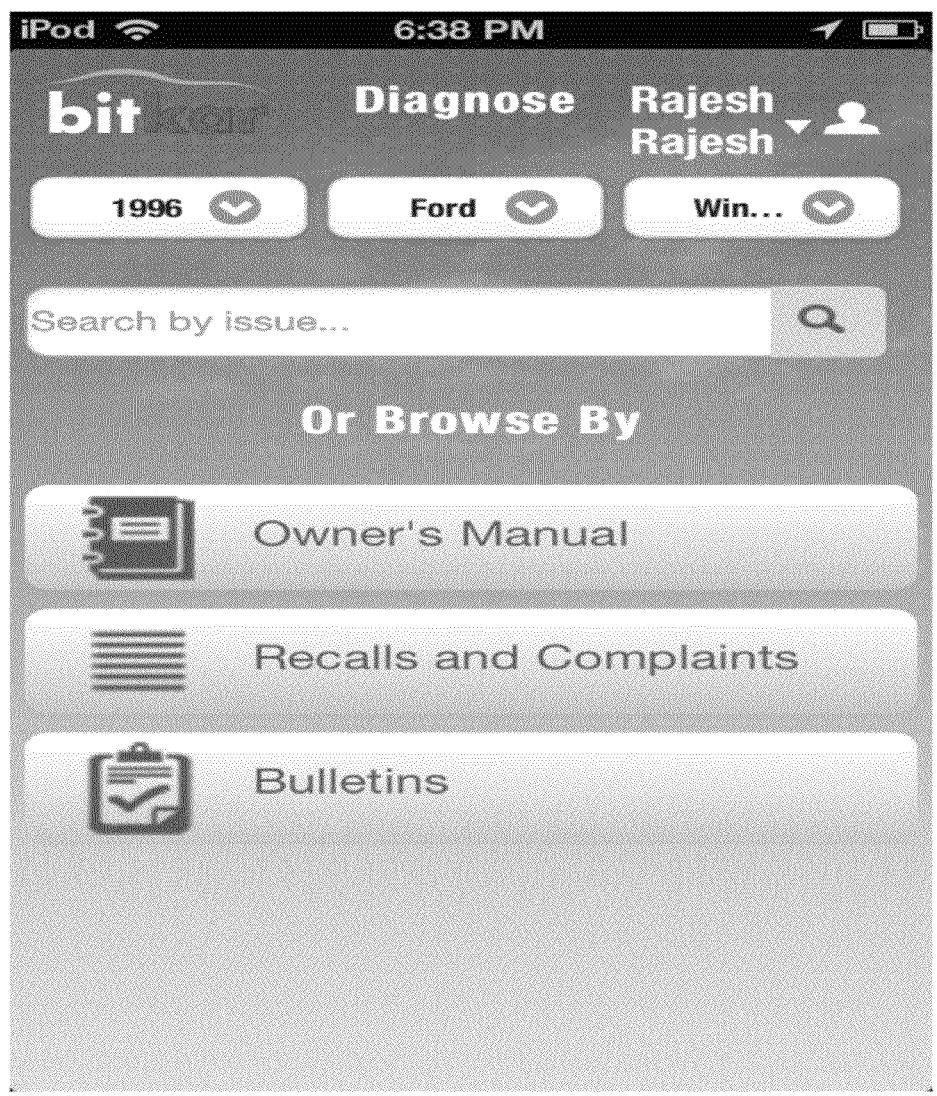

FIGS. 4-11 provide example screen shots of an intelligent vehicle application operating in a mobile device, according to some embodiments. FIG. 4 provides an example view of a log in page for the intelligent vehicle application. FIG. 5 provides an example view a list of a user's vehicles. The list can include images of the user's vehicles as well as information about the vehicles. Although not shown, the intelligent vehicle application can include one or pages that include various fields whereby a user can register and upload vehicle information. Each vehicle's image can include a hyperlink that navigates to other views that provide additional information about each vehicle. For example, a user can navigate to a view of a maintenance history of a particular vehicle as shown in FIG. 6. FIG. 7 provides an example view of an application page that lists vehicle information (e.g. a vehicle knowledge database) compiled and/or generated by third parties such as a vehicle manual database, vehicle recall notices, and/or manufacturer bulletins. In one example, this information can be obtained from various relevant third-party servicers 312 by vehicle service server 310. Vehicle service server 310 can then automatically update the information in a client intelligent vehicle application (e.g. on a periodic basis). Vehicle service server 310 can provide electronic messages (e.g. via text messages, e-mail, augmented reality messages to be displayed on a smart glass display, etc.) to the user that includes updates. For example, a manufacturer can issue a recall on a particular user's vehicle. Vehicle service server 310 can periodically check a recall database (e.g. via an API maintained by the manufacturer) and obtain information about the recall. Alternatively, recalls can be updated on a real-time basis. Notifications to an owner can also be provided on a real-time basis as well (e.g. assuming networking and/or processing latencies). Recall notifications can be displayed on a dash view and/or in a head-mounted display worn by driver. Vehicle service server 310 can then push the recall information to the user's application. Thus, a systematically process of communicating recall information directly to consumer and confirm receipt of recall notice is provided herein. Additionally, a user search a vehicle knowledge database of information about the vehicle (e.g. vehicle manual, recall database, consumer reports information, reviews, etc.) with a search engine. This vehicle knowledge database can be collected and maintained by vehicle service server 310.

Figure 8:
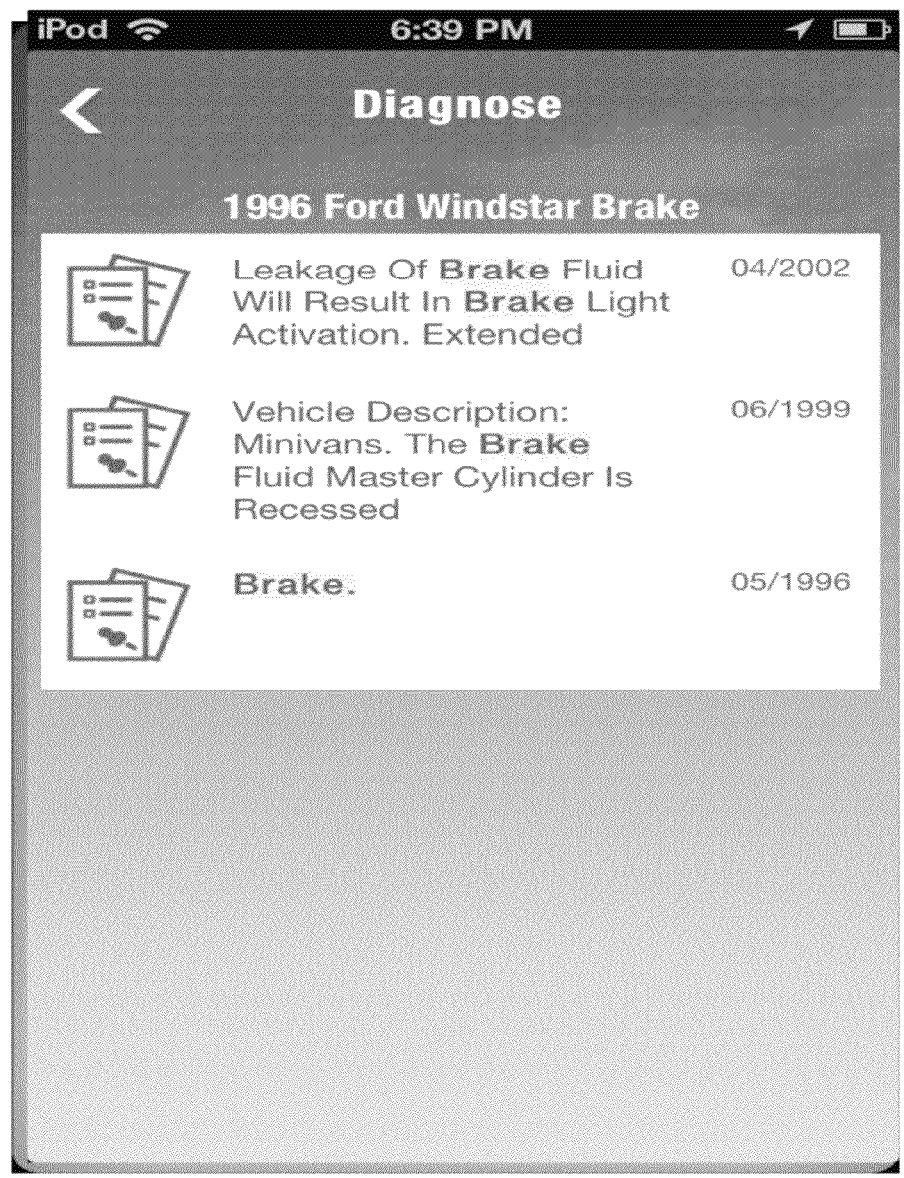

FIG. 8 provides an example view of an application page displaying vehicle diagnostic history information. This information can be maintained in a vehicle history database. Vehicle service server 310 can obtain historical diagnostic information from several sources such as repair shop databases, on-board vehicle computing systems 302, a user upload, a commercial web-based service that supplies vehicle history reports, etc. The intelligent vehicle application in the mobile device can query vehicle service server 310 for the information and/or receive push notifications on a periodic basis. The vehicle history database can be collected and maintained by vehicle service server 310.

Figure 9:
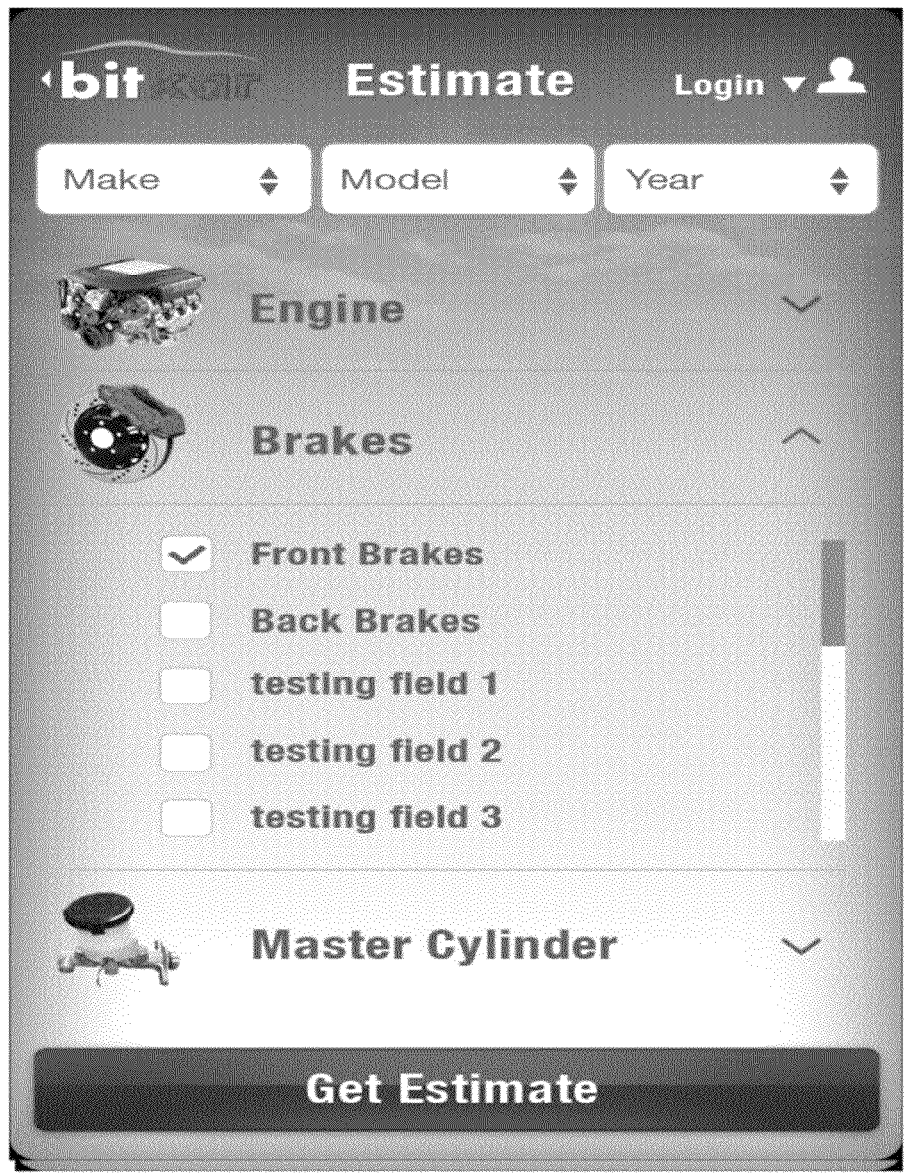
Figure 10:
Figure 11:
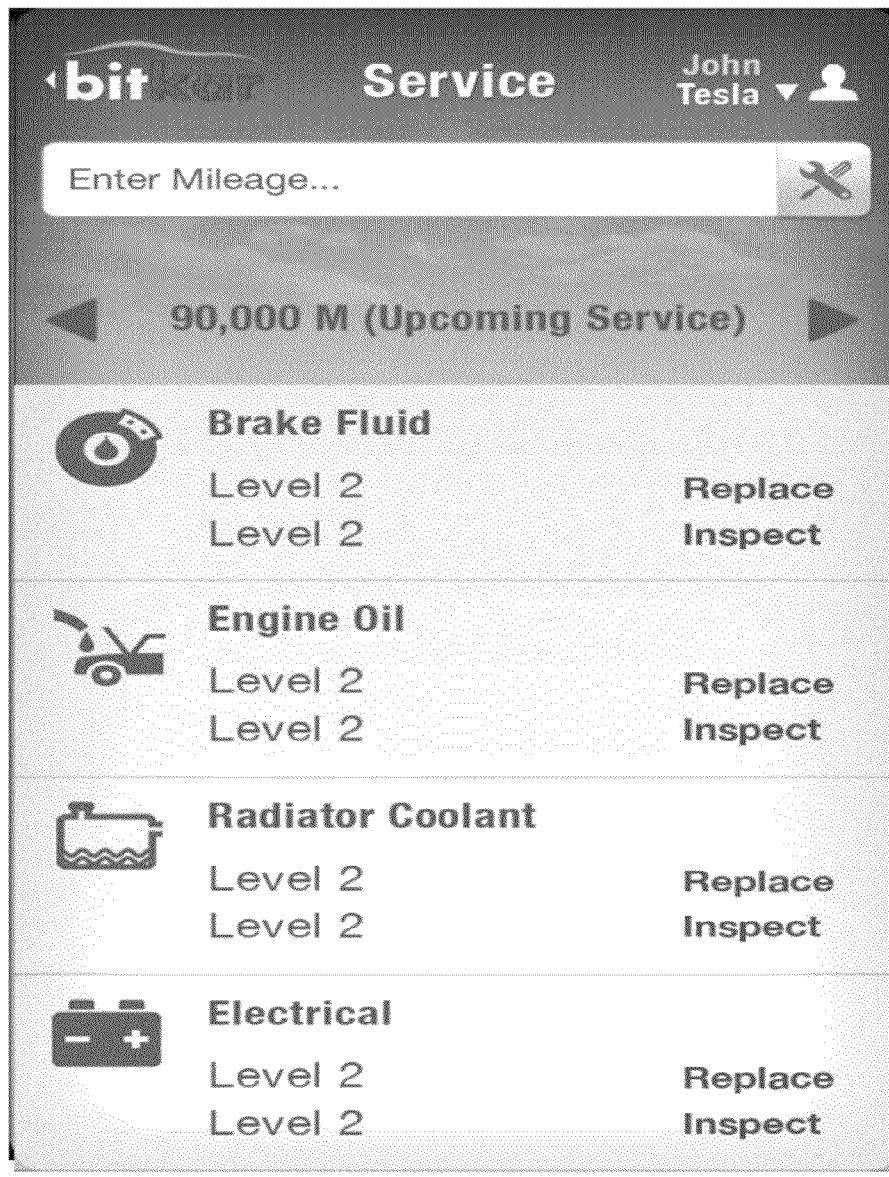

FIG. 9 provides an example view of an application page providing estimate costs for repair services. This application page can be presented in response to various conditions such as a user query and/or a trigger (e.g. an OBD code or set of codes is detected) that automatically alerts the user. The estimate view can also display optional services as well. Estimate costs can be obtained from third parties (e.g. a Hearst) Corporation's MOTOR Information Systems database, a repair shop server, etc.). In this way, the user can access the same information as repair shop in some cases. In some embodiments, costs can be provided in ranges (e.g. based on parts origin directly from automakers, type, location, etc.) as is provided in FIG. 10. For example, the higher costs can be associated with automobile dealer service and automaker parts prices and the lower costs can be associated with after-market part prices and independent repair shop rates. FIG. 11 provides an example view of an application page that enables a user to access vehicle repair information related to pending services.

Example Processes

Figure 12:
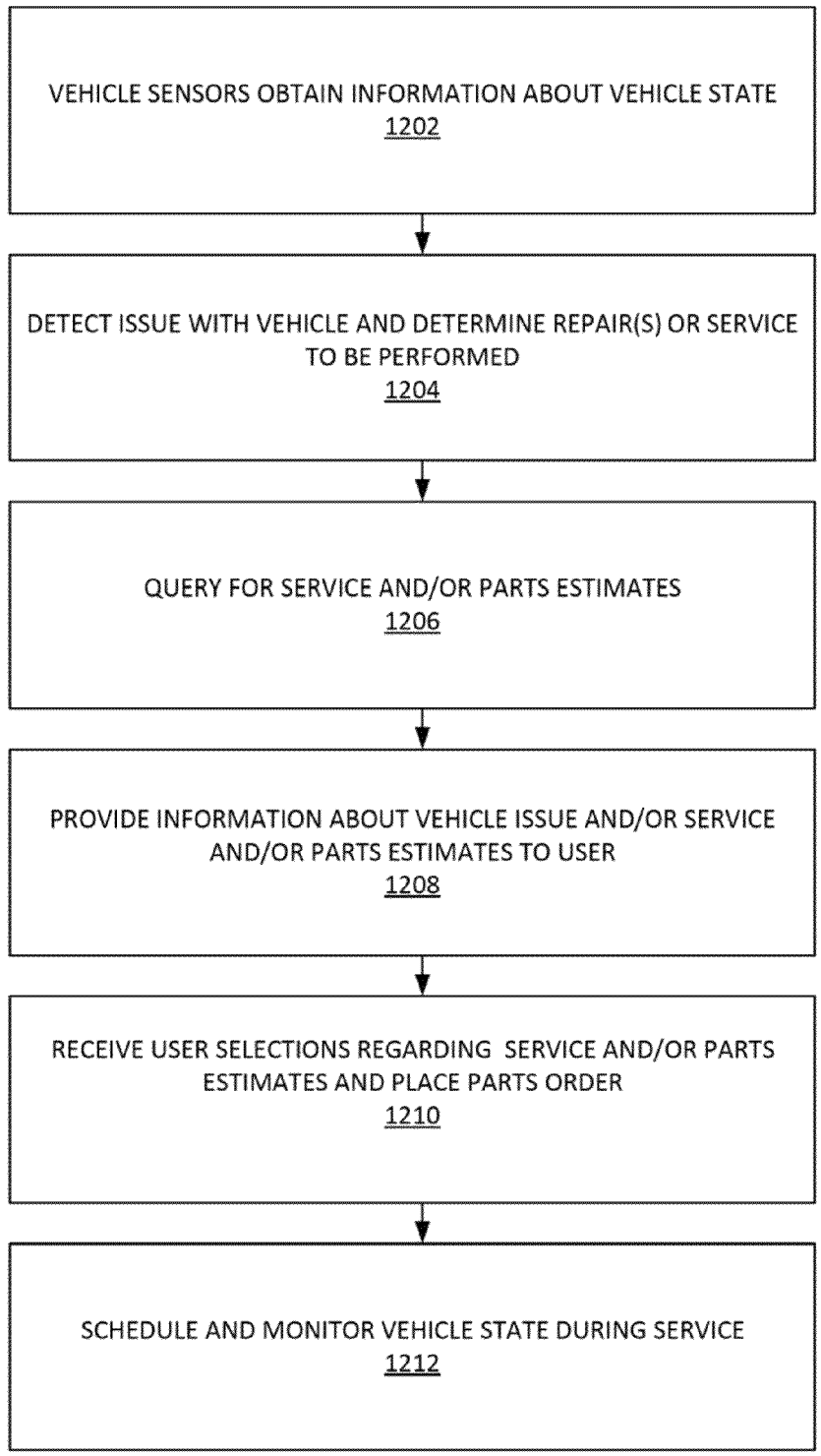
FIG. 12 illustrates an example process of an intelligent vehicle application, according to some embodiments.

FIG. 12 illustrates an example process 1200 of an intelligent vehicle application, according to some embodiments. In step 1202 of process 1200, vehicle sensors can obtain information about a vehicle's current state. For example, a vehicle can have a self-diagnostic and reporting capability, such an OBD system, that monitors sensors in various vehicle sub-systems (e.g. tires, engine, transmission, fluid values, brakes, etc.). In some examples, self-diagnostics can include self-monitoring, self-reporting, self-servicing and/or self-healing functions of a vehicle. In step 1204, the self-diagnostic and reporting capability of the vehicle can provide information of an issue with the vehicle (e.g. a repair is required, the tire pressure should be increased, the oil should be changed, a particular part should be replaced, etc.). Based on this information, a set of repairs can be determined. Accordingly, vehicle service needs can be detected directly from the various system and/or sensors in the vehicle. In this way, vehicle service needs can be determined with additional information other than using vehicle mileage as a proxy. In step 1206, based on the output of step 1204, a query for service and/or parts estimates can be performed. The parts in inventory can be also queried (e.g. from a parts-provider database). The vehicle can then self-order said parts when they are determined to be in the inventory. For example, the servers/websites for a set of local repair shops can be queried for service and/or parts estimates (e.g. with an online automobile parts dealer such as Amazon.com® and/or EBay Motors8). A search functionality and/or a web crawler can be utilized to perform step 1208. Additional information can include specific repair and cost information from repair shops as well as repair shop amenities. In another example, an aggregator of service and/or pans estimates can be queried. In step 1210, the output of the proceeding steps (e.g. the vehicle issue information and/or service and/or parts estimates/providers, parts pricing, availability of pars at a location, available service times, and/or other variables) can be provided to a user. In one example, the aggregated information in step 1210 can be pushed to an application in the user's mobile device for display to the user. In another example, this information can be emailed and/or text messaged to the user. In step 1212, the user can select a repair service and/or parts. An appointment for the service can be scheduled (e.g. via the application in the user's mobile device). It is noted that during the service, the vehicle's computing system can be coupled with a computer network and communicate information about the vehicle state and/or other information about the service (e.g. current cost of the service, estimate of the current service schedule, and the like) to the user and other relevant entities (e.g. vehicle service server 310). In this way, a user can obtain and view real-time status of the vehicles service/repairs. In some examples of process 1200, a vehicle's on-board computing system can perform step 1212 and/or otherwise self-schedule service based on the output of previous steps of process 1200. These decisions can be automatically performed based on tolerance factors previously provided by the user. Users can select and/or weight various parameters to control when the vehicle's system automatically schedules an appointment (e.g. prioritize repair shop nearest to current location, weight manufacture parts greater than non-manufacture parts, etc.). For example, a user can select a high-range for repair/service costs as well as to have the vehicle automatically schedule an appoint when an issue is first detected. Another user can set the system to schedule repair appointments a week after the issue is detected. These examples are provided by way of illustration and not of limitation. The vehicle's on-board computer can communicate with an external computer, such as vehicle service server 310, to facilitate automatic scheduling and selection steps. The systems and functionalities of FIGS. 1-3 can be utilized to implemented process 1200. After the service and/or parts are fulfilled the process can be included in the onboard vehicle service history.

Figure 13:
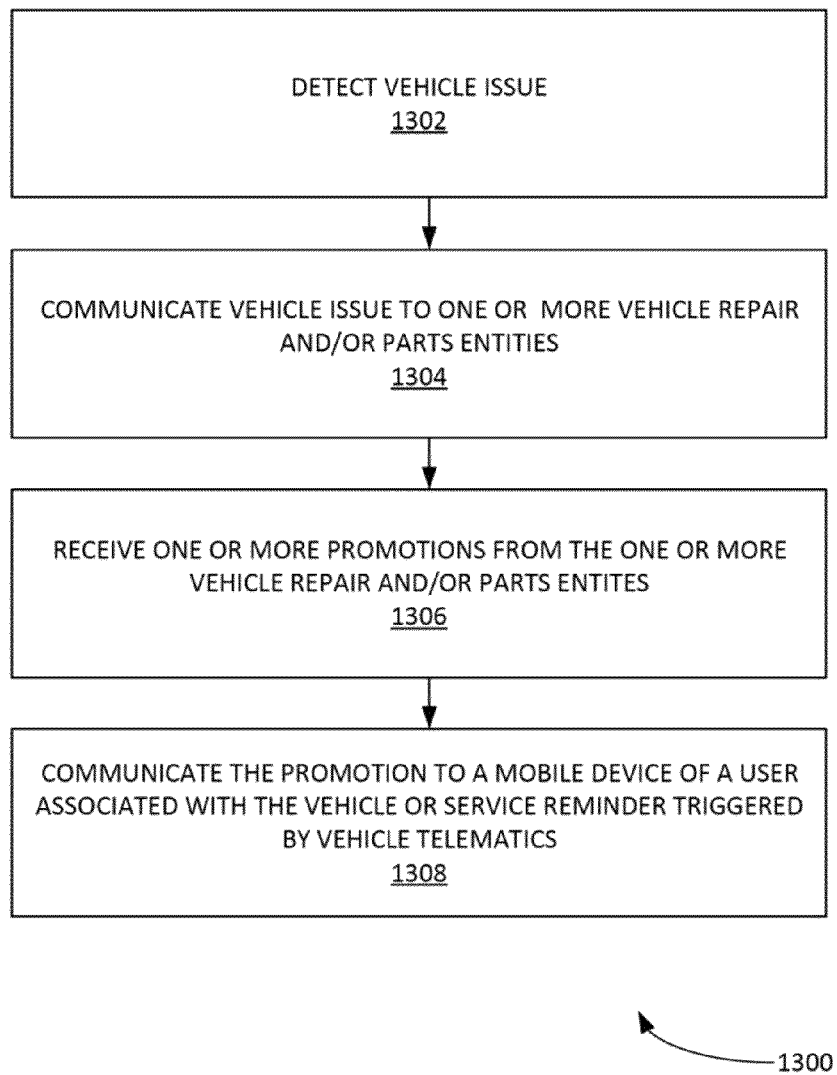
FIG. 13 depicts a process of providing promotions from vehicle repair and/or parts entities to users, according to some embodiments.

FIG. 13 depicts a process 1300 of providing various promotions (e.g. electronic coupons) from vehicle repair and/or parts entities to users, according to some embodiments. In step 1302 of process 1300, a vehicle issue can be detected. For example, an on-board vehicle diagnostic system can detect an impending failure of a vehicle sub-system. The on-board vehicle computer can communicate this information to a server entity operating in a cloud-computing environment. In step 1304, the vehicle issue can be communicated to one or more vehicle repair and/or parts entities. The one or more vehicle repair and/or parts entities can then 'bid' on repair and/or sale of parts involved with the vehicle issue. For example, in step 1306, one more promotions can be received from the one or more vehicle repair and/or parts entities (e.g. in the user's mobile device application, by the server entity operating in a cloud-computing environment). In step 1308, the promotions can be communicated to the mobile device of a user associated with the vehicle. The systems and functionalities of FIGS. 1-3 can be utilized to implement process 1300.

Additional example use cases are now provided. In one example, a user can enable the vehicle diagnostic information to be automatically published to one or more of the user's online social networks (e.g. utilizing a functionality of the vehicle service server 310). In this way, the user's online social networking connections can have the option of offering bids to perform vehicle services and/or other repairs. In another example, a tire PSI reading (e.g. as obtained by a sensor in the tire by on-board vehicle computer 302) can be provided to the mobile device 308 and/or vehicle service server 310. The tire PSI information can be displayed on the user's mobile device in substantially real time while the user fills the tire with air. The system can translate the tire PSI value to a more abstract term such as 'less air' or 'more air'. Air pressure information can be correlated with additional information (e.g. other vehicle environmental data) and an optimal air pressure for fuel efficiency can be calculated. This information can also be provided to a user in real time.

In one example, a telematics enabled customer relationship management (CRM) automotive service and/or parts (e.g. vehicle components such as a brake system, tires, engine, air conditioning, electrical system, etc.). For example, automotive services (can be triggered by changes in the state of the vehicle. Vehicle sensors can detect changes/error codes in a component of the vehicle. The vehicle sensors can communicate changes to an analytics system. The analytics system can communicate these changes/error codes to a service/repair/administration entity (e.g. an automobile maker, automobile service provider, CRM administrator, etc.). An automobile service provider can be an independent mechanic, a dealer and/or retail service chain. The service/repair/administration entity can notify (e.g. via email, text message, voice message, etc.) the automobile owner of issues and/or automatically schedules an appointment for issues, repair and/or recall services.

In one example, a degradation in voltage over the course of six (6) months can be sensed by a voltage sensors in the automobile's battery system. This information can be communicated by a telematics system in the vehicle's analytics unit to the service/repair/administration entity. The service/repair/administration entity can then alert that automobile owner that the battery is dying from the services location.

In another example, brake sensors recognize can detect wearing of brakes (e.g. including pads and rotors) or other related components. This information can be communicated by a telematics unit in the vehicle's analytics unit to the service/repair/administration entity. The service/repair/administration entity can then communicate an alert to the automobile (or other vehicle type such a motorcycle, fork lift, etc.) owner of the degradation of brakes and/or alert a relevant service location to notify then notify the automobile owner.

In another example, the analytics unit (or a server-side functionality in some examples) can automatically order relevant parts when triggered by changes in the state of vehicle. The parts can ordered and/or delivered to pre-authorized service location or home. For example, the analytics unit can detects failure in parts owing to wear and tear or faulty parts based on error codes provided by the vehicle's sensor system. The parts can be ordered based on account settings and/or preferences (e.g. shipping preferences, etc.) that are pre-provided by the vehicle's owner. For example, parts can be ordered from the preferred supplier (e.g. from a dealer or from an 'aftermarket' supplier). The parts delivered to the vehicle owner and/or to a designated automotive shop location that was pre-designated by the vehicle owner. In another example, the sensor system can detected excessive wearing of one or more vehicle tires. A worn tire trigger alert can be automatically communicated to a designated tire dealer and/or service location. The tire(s) can be ordered and/or delivered accordingly.

In some examples, an automotive monitoring system can be implemented. For example, the automotive monitoring system can monitor vehicle events through a remote management system (e.g. using an ADT home monitoring for the automobile) and report any events to a vehicle operation center (VOC). The VOC server can be accesses from an automobile manufacturer, dealer or independent mechanic (e.g. via a web page and/or mobile device application). For example, software deployed in an automobile's control computer (e.g. an automobile analytics system) to tracks events (e.g. distance traveled, component use and state, speeds, etc.) as they occur. These events can be report to a VOC server. The VOC server can take action remotely and/or request the vehicle to be taken to the nearest service location when issues are detected. An automobile analytics system can be both on-board (e.g. local to vehicle's computing system and/or in a cloud-computing platform). In another example, a wheels misalignment can be detected and algorithmically determined (e.g. by an automobile analytics unit) to be causing rapid wear and tear of tires and/or low tire pressure causing loss of fuel efficiency. The tire specifications can be stored locally in a data store in the vehicle. These specifications can be compared with the current tire state. This notion can be applied to any vehicle sub-system as well. The VOC server can receive this information and notify the automobile owner of these issues and/or automatically schedule an appointment to address issues. In one example, the VOC server can include a search functionality to determine a lowest priced service in a nearest location and/or specified radius from the current location of the vehicle.

It is noted that environmental data can be analyzed as well. A vehicle can include weather sensors and/or received local weather information from the Internet (e.g. either via car's detection of weather conditions or via GPS coordinates to get location and weather/traffic/road conditions). This information can be used to suggest actions to a vehicle user (e.g. buy new windshield wipers, adjust tire pressure for colder temperatures, correct fluid types (windshield wiper fluid, oil), snow chain usage, helpful tips, etc.). For example, current tire tread may not be optimal for current road and/or weather conditions. This can trigger an alert. As used herein, environment can include a vehicles current location, predicted location (e.g. based on vehicle traveling direction and/or speed, weather, road conditions, etc.

Figure 14:
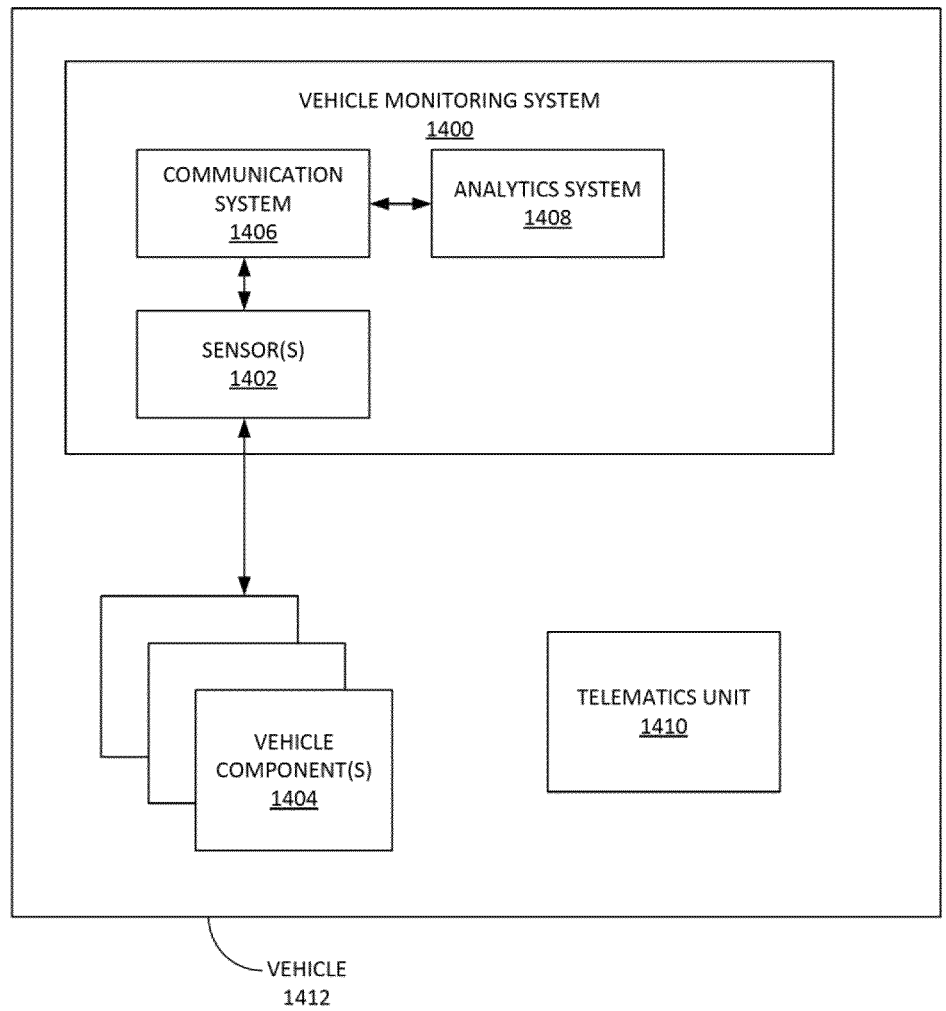
FIG. 14 illustrates, in block format, an example vehicle monitoring system, according to some embodiments.

FIG. 14 illustrates, in block format, an example vehicle monitoring system 1400, according to some embodiments. In one example, the vehicle monitory system 1400 can be used to implement the telematics enabled customer relationship management (CRM) and/or other processes provided supra. Vehicle monitory system 1400 can include sensor system 1402. Sensor system 1402 can be arranged on a set of components of the automobile system and coupled to an energy providing system in the automobile system to be provided with energy by said energy providing system, said sensor system obtaining data about at least one property for each component of the set of components of the automobile system and converting the data into signals. Various sensors can be utilized including, inter alia, brake pad sensor, engine sensors, voltmeters, ohmmeters, other electrical system sensors, fuel sensors, speed sensors, fluid-level sensors, temperature sensors, gyroscopes, accelerometers, capacitors, tire pressure sensors, light/lamp operation sensors, other vehicle component sensors, etc. Vehicle components 1404 can be any system and/or part of a vehicle (e.g. an automobile, etc.). Vehicle components 1404 can be sub-systems of the vehicle. Each sub-system can be associated with a specific service provider and/or parts provider. Alternatively, a general service provider can also be used as an intermediary that selects specific service providers and/or parts providers as well. Communication system 1406 can be in the vehicle 1412 and wirelessly communicating with said sensor system to receive the signals from said sensor system and derive from the signals the data obtained by said sensor system. In some examples, communication system 1406 can utilize a native telematics and/or cellular communication systems such as telematics unit 1410. Analytics system 1408 can communicate with the communication system to receive the data and determine a state of each component of the set of components of the automobile system based on the at least one property of each component, and to trigger a communication when the analytics system detects that a component is in a nonoperational state. The communication can be communicated by the communication system to at least one of an automobile service provider of the automobile system, a parts provider of the component or a Vehicle Operation Center associated with the vehicle system. In some examples, analytics system 1408 can utilize native vehicle computer, diagnostic systems and/or error codes to perform various analytics functions.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. In an automobile including a vehicle self-diagnostic monitoring server and healing system, a vehicle monitoring system comprising:
   an automobile system comprising a self-powered motor vehicle used for transportation;
   a sensor system arranged on a set of components of the automobile system and coupled to an energy providing system in the automobile system to be provided with energy by said energy providing system, said sensor system obtaining data about at least one property for each component of the set of components of the automobile system and converting the data into signals;
   a communication system in the automobile system and wirelessly communicating with said sensor system to receive the signals from said sensor system and derive from the signals the data obtained by said sensor system; and
   an analytics system communicating with the communication system to receive the data and determine a state of each component of the set of components of the automobile system based on the at least one property of each component, and to trigger a communication when the analytics system detects that a component is in a nonoperational state, wherein the communication is communicated by the communication system to at least one of an automobile service provider of the automobile system, a parts provider of the component or a Vehicle Operation Center associated with the vehicle system.

2. The vehicle monitoring system of claim 1, wherein the nonoperational state comprises a specified probability that the component is set to be in a non-operational state with a specified period.

3. The vehicle monitoring system of claim 1, wherein the energy providing system comprises an automotive battery.

4. The vehicle monitoring system of claim 1, wherein the set of components comprises a vehicle brakes system.

5. The vehicle monitoring system of claim 4, wherein the at least one property comprises at least one brake pad worn below a specified parameter.

6. The vehicle monitoring system of claim 5, wherein the analytics system triggers the communication to a breaks service provider that automatically schedules a break inspection for the vehicle system, and wherein an owner of the vehicle system is automatically notified of the break inspection.

7. The vehicle monitoring system of claim 6, wherein the analytics system triggers the communication to an automotive service provider that automatically schedules an automotive battery replacement service, and wherein an owner of the vehicle system is automatically notified of the break inspection.

8. The vehicle monitoring system of claim 1, wherein the set of components comprises automotive battery.

9. The vehicle monitoring system of claim 8, wherein the at least one property comprises a voltage level of the automotive battery as measured by a voltmeter coupled with the automotive battery.

10. The vehicle monitoring system of claim 1, wherein the signal from said sensor system comprises an error code.

11. The vehicle monitoring system of claim 1, wherein a remote server is notified by the communications system that the analytics system has detected that a component is in the nonoperational state.

12. The vehicle monitoring system of claim 11, wherein the remote server matches generates a digital advertisement for the automobile service provider, and wherein the remote server electronically communicates the digital advertisement to a mobile device of the owner of the vehicle system.

13. The vehicle monitoring system of claim 12, wherein the mobile device comprises a user-wearable computing system.

14. The vehicle monitoring system of claim 1, wherein the analytics is implemented in the vehicle system or in a cloud-computing platform.

15. The vehicle monitoring system of claim 1, wherein the vehicle system self-orders a need repair part.

\* \* \* \* \*